United States Patent
Rho et al.

(10) Patent No.: US 11,489,165 B2
(45) Date of Patent: Nov. 1, 2022

(54) SECONDARY BATTERY HAVING SHORT-CIRCUIT PREVENTING FILM

(71) Applicant: AMOGREENTECH CO., LTD., Gimpo-si (KR)

(72) Inventors: Seung Yun Rho, Hwaseong-si (KR); Dong Woo Kim, Cheonan-si (KR); Seung Gon Park, Cheonan-si (KR)

(73) Assignee: AMOGREENTECH CO., LTD., Gyeonggi-Do (KR)

( * ) Notice: Subject to any disclaimer, the term of this patent is extended or adjusted under 35 U.S.C. 154(b) by 391 days.

(21) Appl. No.: 16/638,306

(22) PCT Filed: Aug. 28, 2018

(86) PCT No.: PCT/KR2018/009901
§ 371 (c)(1),
(2) Date: Feb. 11, 2020

(87) PCT Pub. No.: WO2019/045407
PCT Pub. Date: Mar. 7, 2019

(65) Prior Publication Data
US 2020/0227754 A1    Jul. 16, 2020

(30) Foreign Application Priority Data

Aug. 28, 2017   (KR) .................. 10-2017-0108734

(51) Int. Cl.
*H01M 4/66*     (2006.01)
*B01D 71/42*    (2006.01)
(Continued)

(52) U.S. Cl.
CPC ............ *H01M 4/661* (2013.01); *B01D 71/42* (2013.01); *H01M 4/0404* (2013.01); *H01M 4/75* (2013.01);
(Continued)

(58) Field of Classification Search
CPC ...... H01M 4/661; H01M 4/0404; H01M 4/75; H01M 10/0525; H01M 50/461;
(Continued)

(56) References Cited

U.S. PATENT DOCUMENTS

2013/0236766 A1*  9/2013  Seo .................. H01M 50/42
                                          427/458
2017/0288258 A1* 10/2017  Rho .................. H01M 10/052

FOREIGN PATENT DOCUMENTS

JP       2014060122       4/2014
KR     20110001951       1/2011
(Continued)

OTHER PUBLICATIONS

International Search Report—PCT/KR2018/009901 dated Mar. 12, 2019.

*Primary Examiner* — Gary D Harris
(74) *Attorney, Agent, or Firm* — Cantor Colburn LLP (57) ABSTRACT

Provided are an electrode wherein a short-circuit preventing film laminated on the surface of the electrode can prevent a short circuit between a cathode and an anode when a battery is overheated; a secondary battery using the electrode; and a method for manufacturing the electrode. The secondary battery electrode includes: an electrode current collector; an active material layer formed on the electrode current collector; and a short-circuit preventing film laminated on the active material layer, wherein the short-circuit preventing film includes a nanoweb type porous membrane which is formed by integrating nanofiber strands obtained by electrospinning polyacrylonitrile (PAN).

7 Claims, 5 Drawing Sheets

(51) Int. Cl.
  *H01M 4/04* (2006.01)
  *H01M 4/75* (2006.01)
  *H01M 10/0525* (2010.01)
  *H01M 50/46* (2021.01)

(52) U.S. Cl.
  CPC ..... *H01M 10/0525* (2013.01); *H01M 50/461* (2021.01)

(58) Field of Classification Search
  CPC .. H01M 4/131; H01M 4/622; H01M 10/4235; H01M 4/13; H01M 4/139; H01M 4/62; H01M 4/0435; H01M 10/052; H01M 2200/30; B01D 71/42; Y02E 60/10; C09J 133/00; D04H 1/728
  USPC .......................................................... 429/246
  See application file for complete search history.

(56) References Cited

FOREIGN PATENT DOCUMENTS

| | | |
|---|---|---|
| KR | 20130033866 | 4/2013 |
| KR | 20160013368 | 2/2016 |

\* cited by examiner

SECONDARY BATTERY HAVING SHORT-CIRCUIT PREVENTING FILM

CROSS-REFERENCE TO RELATED APPLICATIONS

This application is a national entry of PCT Application No. PCT/KR2018/009901 filed on Aug. 28, 2018, which claims priority to and the benefit of Korean Application No. 10-2017-0108734 filed Aug. 28, 2017, in the Korean Patent Office, the entire contents of which are incorporated herein by reference.

TECHNICAL FIELD

The present invention relates to: an electrode wherein a short-circuit preventing film laminated on the surface of the electrode can prevent a short circuit between a cathode and an anode when a battery is overheated; a secondary battery using the electrode; and a method of manufacturing the electrode.

BACKGROUND ART

A lithium secondary battery generates electric energy by oxidation and reduction reactions when lithium ions are intercalated/deintercalated at a cathode and an anode. The lithium secondary battery is manufactured by using a material capable of reversibly intercalating/deintercalating lithium ions as an active material of the cathode and the anode, and filling an organic electrolytic solution or a polymer electrolyte between the cathode and the anode.

The basic function of a separator of the lithium secondary battery is to separate the cathode and the anode to prevent a short circuit. Furthermore, it is important to maintain high ion conductivity by sucking the electrolyte necessary for the battery reaction.

A secondary battery including a lithium ion secondary battery and a lithium ion polymer battery having a high energy density and a large capacity must have a relatively high operating temperature range and the temperature is raised when the secondary battery is continuously used in a high rate charge/discharge state. Thus, the separators to be used for these secondary batteries are required to have higher heat resistance and thermal stability than those required for ordinary separators.

In general, a separator including a porous ceramic layer is used in which the porous ceramic layer is formed by combining particles of a polyolefin-based or ceramic filler such as polypropylene or polyethylene as a material of the separator with a heat-resistant binder.

When used in the form of a polyolefin-based sheet or film, an excitation space between an anode and the film is generated during overcharging, and lithium ions that could not enter the inside of the anode are accumulated on the surface of the anode, that is, in an excitation space formed between the anode and the film. Accordingly, lithium dendrite, which is extracted in the form of the lithium metal, is formed. Such a lithium dendrite may have a problem that the cathode and the anode are in contact with each other through the film-like separator, and at the same time side reactions occur between the lithium metal and the electrolyte, and the battery is ignited and exploded due to heat generation and gas generation resulting from the side reactions.

In addition, when a separator is used as a porous ceramic layer, a ceramic slurry is cast into an active material of an anode or a cathode to form a thin film. In this case, forming the film uniformly in a constant thickness over a whole area without desorbing a ceramic material requires a very high process precision. A crack occurs when the battery is assembled by laminating the anode and the cathode, and when the coated ceramic is desorbed, there is a problem that the ceramic particles cause the performance deterioration.

Therefore, when using a lithium ion battery having a conventional polyolefin-based film-type or ceramic layer separator, since a non-porous polymer film layer formed on the surface of the electrode affects the movement of lithium ions, in particular, a high output battery may act as a cause of battery performance degradation. In addition, when the conventional anode has a structure that is exposed, the separator exposed to high temperature melts, there is a problem causing a short circuit to ignite.

DISCLOSURE

Technical Problem

The present inventors have found that, when a porous membrane made of a polymer fiber is formed as a short-circuit preventing film on the surface of an anode or a cathode, s short circuit between the cathode and the anode can be prevented from occurring even if the temperature inside the battery rises and shrinkage of a separator occurs, and the migration of lithium ions is not disturbed by the high porosity and the uniform pore distribution of the short-circuit preventing film, so that deterioration of the battery performance does not occur.

In addition, when a polymer coating layer is formed on the surface of the electrode to act as a short-circuit preventing film, the electrode active material cast on the electrode current collector of the anode or the cathode is pressed to complete the electrode and then form the polymer coating layer on the surface of the electrode by using an electrospinning method. In this case, it has been found that peeling may occur due to poor bonding strength.

Further, the present inventors have found that, when forming the porous membrane made of a polymer fiber by an electrospinning method and performing thermocompression bonding, before drying and compression is not completed after casting the electrode active material to the electrode collector of the anode or the cathode, there is a difficulty in electrospinning the less dried electrode active material slurry, and it is difficult to apply the polymer fiber spun on the slurry of the less dried electrode active material, which makes it difficult to apply the mass production process and causes uncompetitiveness.

Accordingly, the present invention has been made to solve the above problems occurring in the prior art, and it is an object of the present invention to provide: an electrode with price competitiveness even in a mass production process by laminating a porous membrane as a short-circuit prevention film on the surface of the electrode by a thermocompression method using a roll press; a secondary battery using the electrode; and a method of manufacturing the electrode.

It is another object of the present invention to provide a secondary battery which is formed by applying a porous membrane as a short-circuit preventing film, to reduce heat shrinkage, keep heat resistance, have excellent ion conductivity and excellent adhesion to an electrode, have excellent cycle characteristics in a battery configuration, and enable a high capacity and a high output.

It is another object of the present invention to provide a secondary battery that does not ignite due to short circuit even if a separator is melted or shrunk at high temperature of 200° C. or higher since the short-circuit preventing film is thermally compressed and laminated on both surfaces of the anode or cathode, in a state where the anode and cathode are laminated on each other.

It is another object of the present invention to provide: an electrode in which a short-circuit preventing film made of a porous polymer web of heat-resistant polymer fibers is formed on the surface of the electrode, thereby preventing short-circuiting between a cathode and an anode even if battery cells are overheated to thus improve stability; a secondary battery using the same; and a method of manufacturing the electrode.

Technical Solution

According to an aspect of the present invention, there is provided a secondary battery electrode including: an electrode current collector; an active material layer formed on the electrode current collector; and a short-circuit preventing film laminated on the active material layer, wherein the short-circuit preventing film includes a nanoweb type porous membrane which is formed by integrating nanofiber strands obtained by electrospinning polyacrylonitrile (PAN).

The porous membrane may be bonded to the active material layer using an acrylic adhesive. In this case, the coating weight of the acrylic adhesive may be 1.6 gsm to 2 gsm.

In this case, the bonding between the active material layer and the porous membrane may use thermocompression bonding.

The thickness of the porous membrane may be 10 μm to 12 μm and the porosity thereof may be 40% to 80%. The air permeability (cfm) of the porous membrane is preferably at least 0.080.

The nanofiber strand may have a diameter ranging from 100 nm to 1.5 μm.

The electrode may have a bicell structure in which the active material layer is formed on both sides of the electrode current collector, and the short-circuit preventing film may be formed on each of the active material layers.

A secondary battery according to another aspect of the present invention may include: a cathode; an anode; and a separator disposed between the cathode and the anode, wherein at least one of the cathode and the anode is formed of the electrode.

A secondary battery according to another aspect of the present invention may include: a cathode; an anode; and a separator disposed between the cathode and the anode, wherein the anode may include: an anode assembly having a bicell structure in which first and second anode active materials are formed on both sides of an anode current collector; and first and second porous membranes pressbonded to the first and second anode active material layers using an acrylic adhesive, each of the first and second porous membranes is formed in a nanoweb style by integrating nanofiber strands having a diameter ranging from 100 nm to 1.5 μm to a thickness of 10 to 12 μm, in which the nanofiber strands are obtained by electrospinning polyacrylonitrile (PAN) and the coating weight of the acrylic adhesive is 1.6 gsm to 2 gsm.

According to another aspect of the present invention, a method for manufacturing an electrode according to the present invention includes: preparing a slurry including an electrode active material; casting a prepared slurry on at least one surface of an electrode current collector to form an electrode active material layer; dissolving polyacrylonitrile (PAN) in a solvent to prepare a spinning solution; integrating nanofiber strands obtained by electrospinning the spinning solution to form a porous membrane in the form of a nanoweb, and then spinning an adhesive on one side of the porous membrane; and laminating a short-circuit preventing film on the surface of the electrode by thermocompressing the electrode active material layer cast on the electrode current collector and the adhesive-spun porous membrane.

The thermocompression may be performed using a roll pressing method at 80° C. to 100° C.

The adhesive may be an acrylic adhesive, and the coating weight of the acrylic adhesive may be 1.6 gsm to 2 gsm.

The preparing of the acrylic adhesive spinning solution may prepare an acrylic adhesive spinning solution by mixing polyvinylidene fluoride (PVdF) and dimethylacetamide (DMAc) in a ratio of 13 wt %:87 wt % and then mixing 300 parts by weight to 500 parts by weight of an acrylic adhesive based on 100 parts by weight of PVdF.

In the method of manufacturing an electrode according to the present invention, the electrode in which the short-circuit preventing film is stacked may be formed in a strip form, and may further include a slitting process for forming a unit cell.

In addition, the method of manufacturing an electrode according to the present invention may further include a drying step for adjusting the solvent and moisture remaining on the surface of the porous membrane to control the strength and porosity of the porous membrane before performing the thermocompression.

Advantageous Effects

As described above, the present invention provides an electrode with price competitiveness even in a mass production process by laminating a porous membrane as a short-circuit preventing film on the surface of the electrode by a thermocompression method using a roll press.

In addition, the present invention provides a secondary battery which is formed by applying a porous membrane as a short-circuit preventing film, to reduce heat shrinkage, keep heat resistance, have excellent ion conductivity and excellent adhesion to an electrode, have excellent cycle characteristics in a battery configuration, and enable a high capacity and a high output.

Further, the present invention provides a secondary battery that does not ignite due to short circuit even if a separator is melted or shrunk at high temperature of 200° C. or higher since the short-circuit preventing film is thermally compressed and laminated on both surfaces of the anode or cathode, in a state where the anode and cathode are laminated on each other.

In the present invention, a short-circuit preventing film made of a porous polymer web of heat-resistant polymer fibers is formed on the surface of the electrode so that, even if the battery is overheated, the short-circuit preventing film prevents a short circuit between the cathode and the anode, thereby improving stability.

In addition, according to the present invention, a separator is manufactured in a state in which the separator is separated from the electrode and then inserted between a cathode and an anode so that a high alignment accuracy is not required when assembled, and a short-circuit preventing film can prevent short-circuiting even if the electrode is pushed due to impact applied after being assembled.

In addition, in the present invention, by forming the short-circuit preventing film integrally on the surface of the electrode, it is possible to prevent micro short circuit due to desorption of the fine active material.

In the present invention, since the short-circuit prevention film is made of the porous polymer web having a high porosity and a uniform pore distribution as compared with the prior art in which ceramic is coated on the surface of an electrode, the performance deterioration can be prevented even at a high output.

In addition, when compared with the conventional ceramic coating technology using a high-purity ceramic, short-circuit preventing film using the heat-resistant polymer material is excellently cost-effective.

BEST MODE

Hereinafter, embodiments of the present invention will be described in detail with reference to the accompanying drawings. The sizes and shapes of the components shown in the drawings may be exaggerated for clarity and convenience.

First, a secondary battery according to an embodiment of the present invention may include an electrode assembly and a housing (casing) for accommodating the electrode assembly, and the electrode assembly may have one of a bicell structure or a full cell structure.

Figure 1:
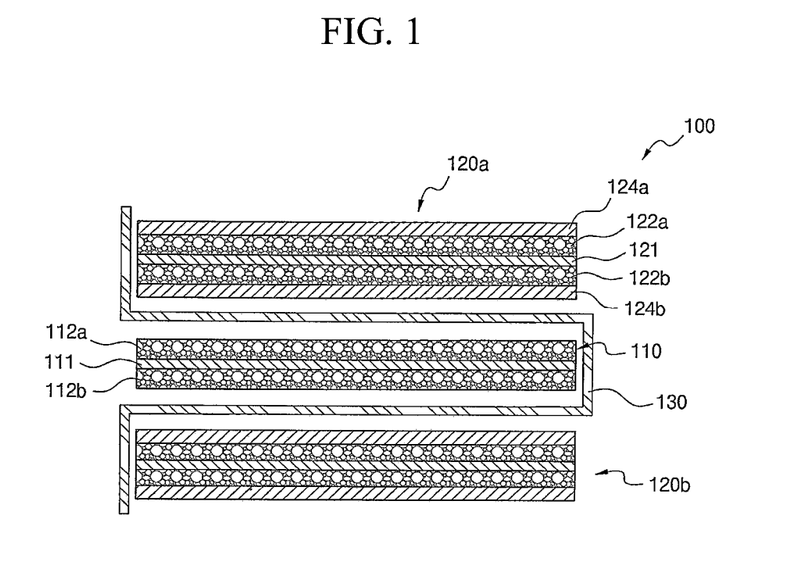
FIG. 1 is a schematic exploded cross-sectional view showing a stack-folding type electrode assembly according to an embodiment of the present invention.

Referring to FIG. 1, according to an embodiment of the present invention, an electrode assembly 100 for a secondary battery is encapsulated in a housing (casing) such as a pouch together with an electrolyte to constitute a secondary battery, and includes a cathode 110, anodes 120a and 120b, and a separator 130.

FIG. 1 shows that the electrode assembly 100 according to an embodiment of the present invention is configured in a stack-folding type, in which each cell has a bicell structure, two anodes 120a and 120b and a cathode 110 are stacked in a stack type, and the separator 130 is disposed to separate between the stacked anodes 120a and 120b and the cathode 110.

FIG. 1 illustrates a structure in which one cathode 110 is disposed between a pair of anodes 120a and 120b, but on the contrary, one anode may be disposed between a pair of cathodes.

The electrode assembly 100 according to an embodiment of the present invention may have a full cell structure other than a bicell structure and the structure of the electrode assembly 100 may be selected according to the capacity of a battery.

In addition, the stack-folding type electrode assembly 100 illustrated in FIG. 1 has a structure in which one cathode 110 is disposed between a pair of anodes 120a and 120b to increase capacity of a battery, but the number of the stacked anodes 120a and 120b and the cathode 110 may be selected according to the capacity of the battery.

Figure 2A:
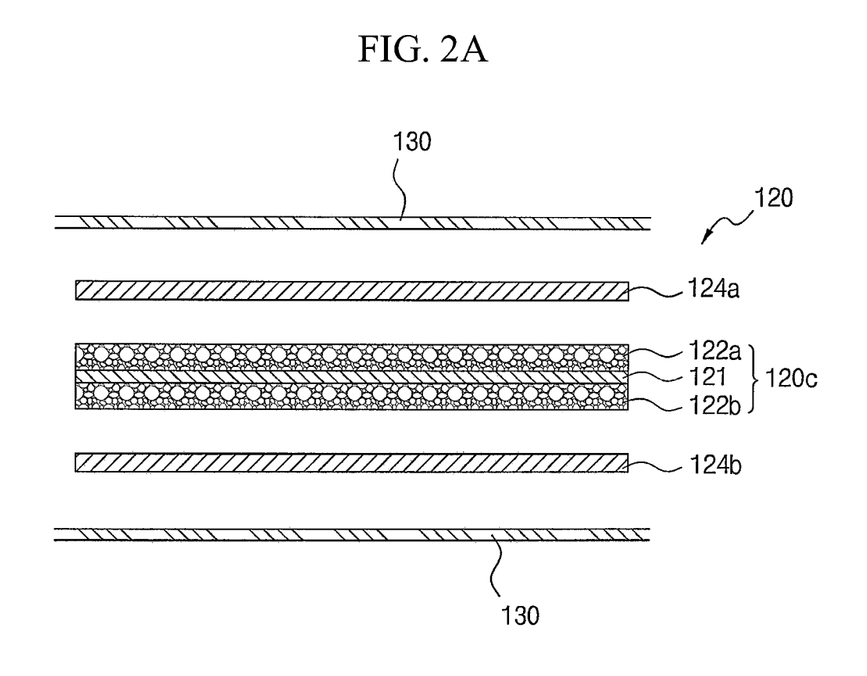
FIGS. 2A and 2B are an exploded cross-sectional view and a sample photographs illustrating a structure in which a short-circuit preventing film is laminated on an anode of a bicell structure according to the present invention, respectively.
Figure 2B:
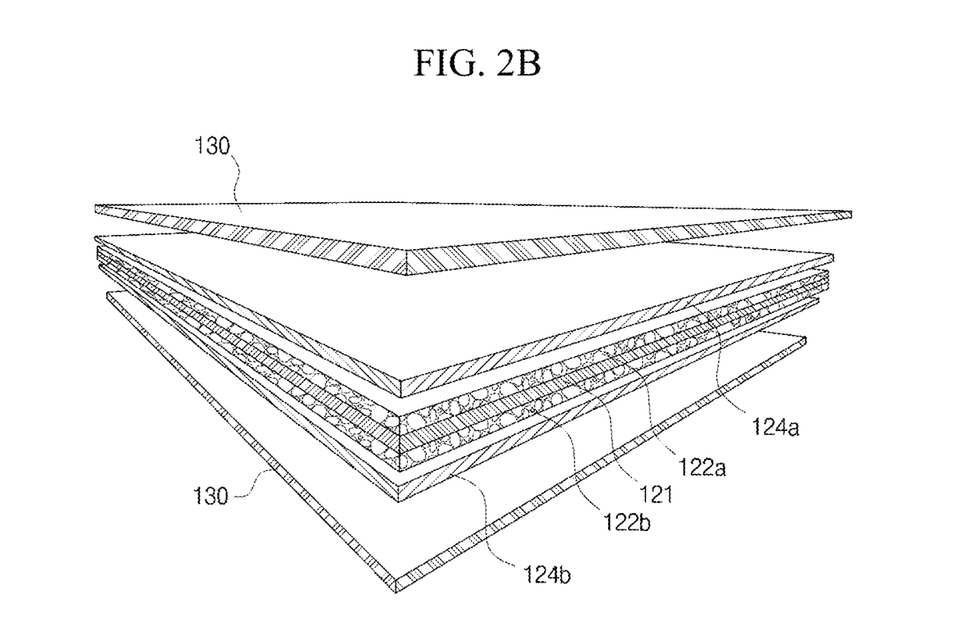

The stacked anodes 120a and 120b, the cathode 110, and the separator 130 may be implemented in the form of a plate-shaped sheet having a predetermined area as shown in FIGS. 2A and 2B, respectively.

In addition, the separator 130 may be formed in one film form separating and surrounding the anodes 120a and 120b and the cathode 110 stacked as shown in FIG. 1. The separator 130 can be extended to surround all of the stacked anodes 120a and 120b and the cathode 110.

Referring to FIG. 1, the anodes 120a and 120b and the cathode 110 constituting the electrode assembly 100 according to an embodiment of the present invention each may have a pair of electrode active material layers on both sides of the electrode current collector to form a bicell (see FIG. 2A).

The cathode 110 includes cathode active material layers 112a and 112b on both surfaces of a cathode current collector 111, and the anodes 120a and 120b, that is, anodes 120c include anode active material layers 122a and 122b on both surfaces of an anode current collector 121, respectively.

Here, the anode current collector 121 and the cathode current collector 111 may be made of a thin metal foil or mesh and may be formed of a metal such as copper, aluminum, stainless steel, nickel, titanium, chromium, manganese, iron, cobalt, zinc, molybdenum, tungsten, silver, gold, and alloys thereof.

In addition, the cathode current collector 111 and the anode current collector 121 may have a cathode terminal and an anode terminal protruding from the respective bodies for electrical connection with an external device.

Meanwhile, the cathode active material layers 112a and 112b include a cathode active material capable of reversibly intercalating and deintercalating lithium ions. Representative examples of such a cathode active material may include one or a mixture of two or more of: layered compounds such as lithium cobalt oxide ($LiCoO_2$) and lithium nickel oxide ($LiNiO_2$), or compounds substituted with one or more transition metals; lithium manganese oxide (LMO) such as a chemical formula $Li_{1+y}Mn_{2-y}O_4$ (where y is 0 to 0.33), $LiMnO_3$, $LiMn_2O_3$, and $LiMnO_2$; lithium copper oxide such as $Li_2CuO_2$; vanadium oxide such as $LiV_3O_8$, $LiFe_3O_4$, $V_2O_5$, and $Cu_2V_2O_7$; Ni-site type lithium nickel oxide represented by a chemical formula $LiNi_{1-y}M_yO_2$ (where M=Co, Mn, Al, Cu, Fe, Mg, B or Ga and y=0.01 to 0.3); lithium manganese complex oxide represented by a chemical formula $LiMn_{2-y}M_yO_2$ (where M=Co, Ni, Fe, Cr, Zn or Ta and y=0.01 to 0.1) or $Li_2Mn_3MO_8$ (where M=Fe, Co, Ni, Cu or Zn); $LiMn_2O_4$ in which a part of Li in the chemical formula is substituted with an alkaline earth metal ion; disulfide compound; carbon such as $Fe_2(MoO_4)_3$, non-graphitized carbon, and graphite carbon; metal complex oxide such as $Li_xFe_2O_3$ ($0 \le x \le 1$), $Li_xWO_2$ ($0 \le x \le 1$), $Sn_xMe_{1-x}$ $Me'_yO_z$ (Me:Mn, Fe, Pb, Ge; Me':Al, B, P, Si, elements of Groups 1, 2 and 3 of the periodic table, halogen; $0<x\leq1$; $1\leq y\leq3$; $1\leq z\leq8$); lithium metal; lithium alloy; silicon-based alloy; tin-based alloy; metal oxide such as $SnO_2$, $PbO_2$, $Pb_2O_3$, $Pb_3O_4$, $Sb_2O_3$, $Sb_2O_4$, $Sb_2O_5$, $GeO_2$, $Bi_2O_3$, $Bi_2O_4$ and $Bi_2O_5$; lithium nickel cobalt manganese (NCM)-based active material; and a material capable of absorbing and desorbing lithium such as Li—Co—Ni-based materials, but are not limited thereto.

In addition, the anode active material layers 122a and 122b include an anode active material capable of reversibly intercalating and deintercalating lithium ions. Such anode materials may be selected from the group consisting of carbon-based anode active materials of crystalline or amorphous carbon, carbon fibers, or carbon composites, tin oxide, lithiated carbon-based anode active materials, lithiated tin oxide, lithium, lithium alloys, and mixtures of two or more thereof. Here, the carbon may be at least one selected from the group consisting of carbon nanotubes, carbon nanowires, carbon nanofibers, graphite, activated carbon, graphene and graphite.

However, the cathode active material and the anode active material used in the present invention are not limited thereto, and a cathode active material and an anode active material that are commonly used may be used.

The separator 130 is disposed between the cathode 110 and the anodes 120a and 120b whenever the plurality of cathode 110 and anodes 120a and 120b are stacked. The separator 130 may be a single layer polyolefin-based porous separator, or a multi-layered polyolefin-based porous separator having a shutdown function.

In addition, the separator 130 may be a high heat-resistant separator with reduced heat shrinkage by coating a ceramic slurry made of a ceramic material and a binder on one side or both sides of a polyolefin-based porous separator to improve the heat resistance performance of the separator 130 to form a ceramic coating layer.

Furthermore, the separator used in this embodiment is composed of an ultrafine fiber-phase of a mixture of a heat-resistant polymer and inorganic particles, or a mixture of a heat-resistant polymer, a swellable polymer, and inorganic particles, or may be a separator in which a non-pore polymer film layer serving as an adhesive layer is laminated on a porous polymer fiber web layer serving as an ion-impregnated layer.

In addition, the separator used in this embodiment may be a separator containing a pair of porous polymer fibrous webs which are laminated on one side or both sides of a porous nonwoven fabric having micropores and which serve as an adhesive layer and an ion-impregnated layer when closely contacting an opposed electrode.

For example, the porous nonwoven fabric may employ any one of a nonwoven fabric made of PP/PE fibers having a double structure in which PE is coated on an outer periphery of a PP fiber as a core, a PET nonwoven fabric made of polyethylene terephthalate (PET), and a nonwoven fabric made of cellulose fibers.

The non-pore polymer film layer may be obtained by dissolving a polymer capable of swelling in an electrolytic solution and conducting electrolytic ions in a solvent to form a spinning solution, electrospinning the spinning solution to form a porous polymer fiber web made of ultrafine fiber phase, and calendering or heat-treating the porous polymer fiber web at a temperature lower than a melting point of the polymer (for example, PVdF).

The porous polymer fiber web layer is formed by dissolving a mixture of a heat-resistant polymer and inorganic particles or a mixture of a heat-resistant polymer, a swellable polymer, and inorganic particles in a solvent to form a spinning solution, electrospinning the spinning solution onto a non-pore polymer film layer to form a porous polymer fiber web made of an ultrafine fiber phase, and calendering the obtained porous polymer fiber web at a temperature equal to or lower than the melting point of the polymer.

In addition, when the mixture is a mixture of a heat-resistant polymer, a swellable polymer and inorganic particles, the heat-resistant polymer and the swellable polymer are preferably mixed in a weight ratio ranging from 5:5 to 7:3, more preferably 6:4. In this case, the swellable polymer is added as a binder to facilitate bonding between the fibers.

When the mixing ratio of the heat-resistant polymer and the swellable polymer is less than 5:5 in a weight ratio, the heat resistance is lowered and the high temperature property is not obtained. When the mixing ratio is more than 7:3 in a weight ratio, the strength is lowered and a spinning trouble occurs.

The heat-resistant polymer resin usable in the present invention is a resin which can be dissolved in an organic solvent for electrospinning and has a melting point of 180° C. or higher, and examples of the usable heat-resistant polymer resin may include: any one or mixtures of two or more selected from aromatic polyester such as polyacrylonitrile (PAN), polyamide, polyimide, polyamide-imide, poly (meta-phenylene iso-phthalamide), polysulfone, polyether ketone, polyethylene terephthalate, polytrimethylene terephthalate, and polyethylene naphthalate; polyphosphazenes such as polytetrafluoroethylene, polydiphenoxy phosphazene, and poly {bis [2-(2-methoxyethoxy) phosphazene]}; polyurethane co-polymers including polyurethane and polyether urethane; cellulose acetate, cellulose acetate butylrate, cellulose acetate propionate, polyester sulfone (PES), and polyether imide (PEI).

The swellable polymer resin usable in the present invention is a resin which swells in an electrolytic solution and can be formed into ultrafine fibers by electrospinning, and for example, the swellable polymer resin may include: polyvinylidene fluoride (PVdF), poly (vinylidene fluoride-co-hexafluoropropylene), perfluoropolymers, polyvinyl chloride, or polyvinylidene chloride, and co-polymers thereof; polyethylene glycol derivatives containing polyethylene glycol dialkylether and polyethylene glycol dialkyl ester; polyoxide containing poly (oxymethylene-oligo-oxyethylene), polyethylene oxide and polypropylene oxide; polyacrylonitrile co-polymers containing polyvinyl acetate, poly (vinyl pyrrolidone-vinyl acetate), polystyrene and polystyrene acrylonitrile co-polymers, polyacrylonitrile methyl methacrylate co-polymers; polymethyl methacrylate or polymethyl methacrylate co-polymers, and a mixture thereof.

When a mixed polymer is used, the porous polymer fiber web layer may be formed by using a heat-resistant polymer such as polyacrylonitrile (PAN) or a swellable polymer such as PVdF.

The most important role of the separator in the secondary battery is to ensure safety by separating a cathode and an anode under any circumstances. Particularly, when the terminal body is operated for a long time, heat is generated in the secondary battery, shrinkage of the separator occurs due to internal heat generation of the battery, and the cathode and the anode may directly contact due to the missing portion caused by shrinkage of the separator. In addition, in the case of a film type separator, lithium dendrite may be formed on the surface of an anode when charge and discharge of a lithium secondary battery is repeated.

In the present invention to solve the problems of the above-described conventional secondary battery, short-circuit preventing films 124a and 124b are integrally formed on the surfaces of the electrode, that is, on the surface of at least one of the cathode 110 and the anodes 120a and 120b, in addition to the separator 130 for separating the cathode 110 and the anodes 120a and 120b, with a result that a secondary battery does not ignite due to short circuit even if the separator is melted or shrunk at high temperature of 200° C. or higher.

In the present invention, short-circuit preventing films 124a and 124b are formed on both surfaces of the anodes 120a and 120b and/or the cathode 110 having a bicell structure. In the embodiment shown in FIG. 1, for example, short-circuit preventing films 124a and 124b are formed on the surfaces of the anodes 120a and 120b having a relatively large area, in order to minimize the thickness of the cell. However, short-circuit preventing films according to another embodiment of the present invention may be formed on the cathode, or may be also formed on all of the anodes 120a and 120b and the cathode 110.

As described above, in the present invention, short-circuit preventing films 124a and 124b are formed on both surfaces of the anodes 120a and 120b and/or the cathode 110. In this case, the structure in which the cathode active material layers 112a and 112b are formed on both surfaces of the cathode current collector 111 may be referred to as a cathode assembly instead of be referred to as a cathode, and the structure in which the anode active material layers 122a and 122b are formed on both surfaces of the anode current collector 121 may be referred to as an anode assembly 120c (see FIG. 2A) instead of being referred to as an anode. Accordingly, the anodes 120a and 120b and the cathode 110 according to the present invention may refer to a structure in which the short-circuit preventing films 124a and 124b are formed in the anode assembly 120c and the cathode assembly, respectively.

In the present invention, for example, sheet-type porous membranes may be used as the short-circuit preventing films 124a and 124b, and may be stacked and used on the surfaces of the anodes 120a and 120b with a thermocompression method using a roll press.

Porous polymer membranes in the form of nanowebs are used as the short-circuit preventing films 124a and 124b, in which the nanoweb type porous polymer membranes are formed by integrating polymer nanofiber strands made of a range of 100 nm to 1.5 µm, preferably less than 1 µm in average diameter by dissolving a fiber-forming polymer material in a solvent to prepare a spinning solution, and then electrospinning the spinning solution by using an electrospinning device.

Generally, lithium ion batteries have a temperature of about 150° C. at which the electrolyte is vented. Accordingly, when the melting point of the polymer material forming the short-circuit preventing film is about 180° C., the anode and the cathode may be short-circuited when the vent of the electrolyte is not completely made. If the electrolyte remains when the anode and the cathode are short-circuited, the electrolyte may serve as a movement passage of lithium ions, which cannot prevent the movement of lithium ions.

Therefore, in order to implement a secondary battery that does not ignite even at a high temperature of about 200° C. or higher, it is required to use a heat-resistant polymer compound having higher heat resistance properties as the polymer material used to form the short-circuit preventing film.

In this case, an available polymer material is required to employ an electrospinnable material as a heat-resistant polymer material that does not cause ignition or shrinkage until the vent of the electrolyte is completely achieved. A material that does not cause ignition even at a high temperature of about 200° C. or higher, and that does not cause shrinkage up to 250° C., for example, polyacrylonitrile (PAN) may be used as the heat-resistant polymer material that satisfies these conditions. Therefore, porous membranes obtained by electrospinning PAN may be applied as the short-circuit preventing films 124a and 124b.

In the present invention, the porous membranes are prepared first, and then laminated on both sides of the electrode using an acrylic adhesive or the like to form the short-circuit preventing films 124a and 124b, thereby exhibiting properties of low heat shrinkage and heat resistance so that no ignition occurs at high temperatures.

Hereinafter, a method of forming an electrode, for example, an anode, having short-circuit preventing films, will be described with reference to FIGS. 2A to 3B.

In the present invention, for example, as shown in FIG. 2A, an anode slurry is prepared by mixing an anode active material, a conductive material, a binder and an organic solvent in a predetermined ratio (S11). Then, the prepared slurry is cast on one or both surfaces of a copper foil (a Cu foil) or a mesh as the anode current collector 121 to thereby form the anode active material layers 122a and 122b, and dried, to thus prepare the anode 120 (or anode assembly 120c) (S12 and S13). In this case, the anode current collector 121 may be a strip-shaped electrode current collector so that a continuous subsequent process can be performed during mass production.

Figure 3A:
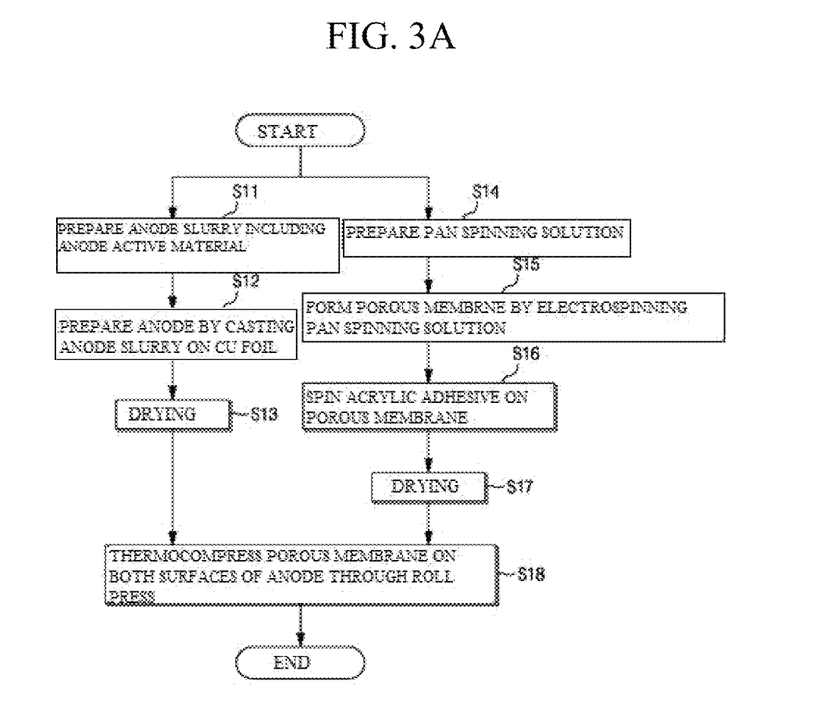
FIGS. 3A and 3B are a flowchart view and a manufacturing process diagram respectively illustrating a process of manufacturing an anode according to an embodiment of the present invention.

Meanwhile, as a heat-resistant polymer material for forming a porous membrane, for example, polyacrylonitrile (PAN) can be used. A spinning solution is prepared by mixing PAN and a solvent of dimethylacetamide (DMAc) in a mixing ratio of 12±2 wt %:88±2 wt % (S14). In this case, when a PAN mixing ratio is out of an error range, it is difficult to obtain an accurate thickness of PAN.

The prepared spinning solution is then electrospun onto a transfer sheet, for example, a sheet of release paper, using an electrospinning device, to accumulate nanofiber strands, to accordingly manufacture a porous membrane 124 in the form of a nanoweb (S15). In this case, the thickness of the porous membrane 124 is preferably in the range of 10 µm to 12 µm, the weight thereof is preferably 3 grams per square meter (gsm), and the porosity thereof is preferably in the range of 40% to 80%.

The PAN fiber strands of the electrospun heat-resistant polymer material preferably have a diameter in the range of 100 nm to 1.5 µm, more preferably have a diameter of about 1.0 µm.

In the case that the thickness of the porous membrane 124 is less than 10 µm, the temperature of the porous membrane 124 rises due to heat generation according to the operation of the battery after the porous membrane 124 is wetted in the electrolyte, to accordingly cause the porous membrane 124 to melt. Therefore, the porous membrane 124 should have a thickness of at least 10 µm. If the thickness of the porous membrane 124 exceeds 12 µm, the cell thickness is increased too much, and thus there may be a problem that the cell energy density is lowered.

The air permeability (cfm) of the porous membrane 124 is related to the coating weight of the adhesive. The larger the coating weight of the adhesive, the higher the adhesive strength, but the air permeability (cfm) decreases and the battery's internal resistance (AC-IR) increases, which reduces the battery capacity. Therefore, the coating weight of the adhesive should have at least 0.08 cfm. The reason is the minimum air permeability for the movement of lithium ions during cell fabrication.

Thereafter, the porous membrane 124 is formed on a sheet of the release paper by electrospinning, and then the acrylic adhesive is spun by an electrospinning method or an electrospinning method for lamination with the electrode (S16).

An acrylic resin obtained by copolymerizing a monomer which has an acryl acid derivative or a methacryl acid derivative as a main component as the acrylic adhesive is mixed with polyvinylidene fluoride (PVdF) together with an organic solvent, for example dimethylacetamide (DMAc) to prepare a spinning solution. Here, PVdF serves as a binder.

Here, PVdF and DMAc are first mixed in a 13±3 wt %:87±3 wt % ratio, and then is mixed with 300 parts by weight to 500 parts by weight of an acrylic resin based on 100 parts by weight of PVdF, to thereby prepare an acrylic adhesive spinning solution. In this case, when mixing the PVdF and an organic solvent such as DMAc, the continuity of the acrylic adhesive is inferior if the mixing ratio of PVdF is less than the error range. In addition, when less than 300 parts by weight of the acrylic resin with respect to 100 parts by weight of PVdF is mixed in the acrylic adhesive spinning solution, the adhesive force is lowered, while when the acrylic resin is mixed in excess of 500 parts by weight, there may be a problem that the capacity of the battery is reduced.

Subsequently, the prepared acrylic adhesive spinning solution is spun on the porous membrane 124 by an electrospinning method. Here, the coating weight of the spinning acrylic adhesive is 1.6 gsm to 2 gsm and the thickness thereof is 1 μm to 2 μm. When the coating weight of the acrylic adhesive exceeds 2 gsm, air permeability (cfm) is reduced and the internal resistance of the battery (AC-IR) is increased, thereby reducing the battery capacity. When the coating weight of the acrylic adhesive is less than 1.6 gsm, the air permeability (cfm) is increased and the internal resistance of the battery (AC-IR) is reduced, but there may be a problem that the adhesion strength of the porous membrane 124, that is, the short-circuit preventing film is lowered.

Since the organic solvent is mixed at the time of spinning the acrylic adhesive, the organic solvent is volatilized by proceeding with natural drying in accordance with the lamination situation of the subsequent process (S17).

Figure 3B:
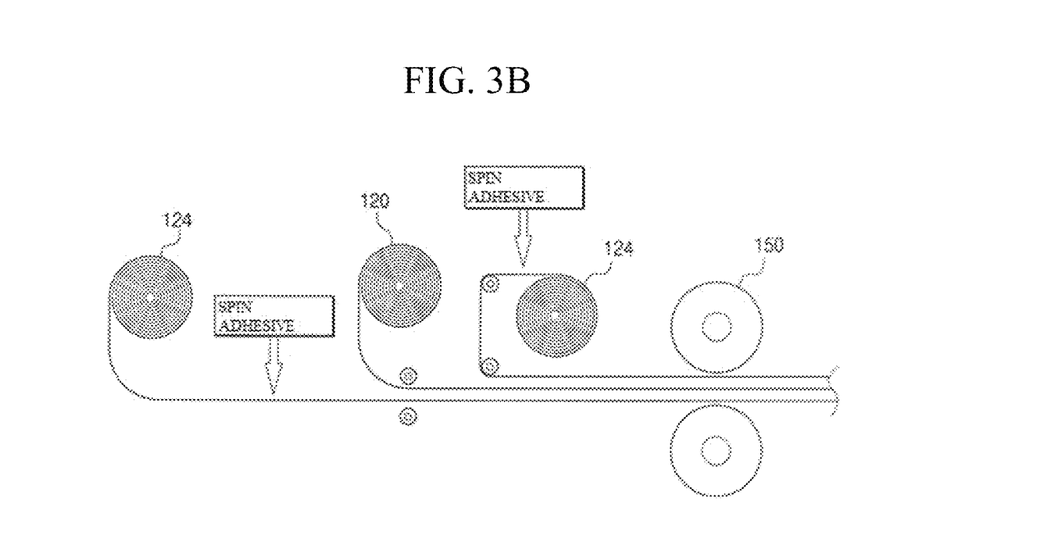

Subsequently, as shown in FIG. 3B, the anode 120 in a strip form is set to be disposed between the pair of porous membranes 124 on one side of which the acrylic adhesive is spun, and thermocompression is performed by passing through a roll press device 150 to laminate a pair of porous membranes 124 on both surfaces of the anode 120 (S18).

In this case, it is preferable to set the thickness of the roll press to 120 μm or so, and is adjusted considering the elasticity of the porous membrane 124. The thermocompression temperature is determined by the adhesive.

When the acrylic adhesive is used to laminate (bond) the porous membrane 124 and the anode 120, the thermocompression temperature is preferably set in the range of 80° C. to 100° C.

That is, when the thermocompression temperature exceeds 100° C., the acrylic adhesive melts at the time of lamination (bonding), and soaks into the pores of the porous membrane 124 to decrease adhesion. Meanwhile, when the thermocompression temperature is less than 80° C., there may be a problem that the adhesiveness of the acrylic adhesive is inferior.

The anode (or anode assembly) 120 used in the manufacturing process of FIG. 3B has a bicell structure in which anode active material layers 122a and 122b are formed on both surfaces of the anode current collector 121.

Thereafter, when the laminated laminate is cut into the required size and length, a pair of short-circuit preventing films 124a and 124b formed of the porous membranes 124 are formed on both surfaces of the anode 120.

As described above, in the present invention, the strip type porous membrane is laminated (bonded) as one or both sides of the strip type electrode as a short-circuit preventing film, with the thermocompression method using a roll press, and then cut into a predetermined size to form a unit cell. Therefore, the present invention is competitive in price even in the mass production process.

In the case of constructing a high-capacity secondary battery, the active material layer is formed as a thick film. In the case of constructing a high-output secondary battery, the active material layer is preferably formed as a thin film.

The short-circuit preventing films 124a and 124b formed of the porous polymer membranes thermally compressed on the surface of the cathode or anode active material layer may be formed of a heat-resistant polymer material, and thus even if the separator 130 is shrunk, deformed, or shifted due to the overheated battery, the short-circuit preventing films are not shrunk or deformed. Also, since the short-circuit prevention layer 140 is integrally formed to cover at least one surface of the cathode 110 and the anode 120, a short circuit between the cathode 110 and the anode 120 can be prevented.

As described above, when the strip-shaped cathode 110 and the strip-shaped anode 120 having the short-circuit preventing films 124a and 124b stacked on at least one of the cathode 110 and the anode 120 are prepared, a unit cathode cell and a unit anode cell are formed through a process such as slitting and notching, and as shown in FIG. 1, the stacking-foldable electrode assembly 100 may be configured by stacking the unit cathode cell and the unit anode cell with the film type separator 130 interposed therebetween. When lamination is completed, terminal welding is performed on the terminal portions of the cathode current collector 111 and the anode current collector 121 by, for example, ultrasonic welding. After welding the terminal portions of the cathode current collector 111 and the anode current collector 121, the stacking-foldable electrode assembly 100 is put into a pouch and the pouch sealing is performed to seal the pouch containing the stacking-foldable electrode assembly 100.

Further, a film type separator may be inserted between the strip-shaped cathode 110 and the strip-shaped anode 120, to then be laminated, and then wound, to form a roll type electrode assembly 100.

After assembling the electrode assembly, the electrode assembly may be encapsulated in a housing (casing) such as a pouch together with an electrolyte solution or a polymer electrolyte, to thus manufacture a secondary battery.

In addition, after the electrode assembly is assembled, the electrode assembly is inserted into an aluminum or aluminum alloy can or similar container, and then the opening of the can or similar container is closed with a cap assembly, and an electrolyte is injected into the opening to manufacture a lithium secondary battery.

Hereinafter, the present invention will be described in detail with reference to the following examples. However, the following examples are intended to illustrate the present invention, and the scope of the present invention is not limited thereto.

Example 1

To obtain a sample of the porous membrane (Example 1), PAN and an organic solvent of dimethylacetamide (DMAc) were mixed in a mixing ratio of 12 wt %:88 wt % to make a spinnable PAN spinning solution, and the spinnable PAN spinning solution was electrospun onto a sheet of release paper using an electrospinning device to integrate the nanofiber strands. Accordingly, a porous membrane was manufactured in the form of a nanoweb. In this case, the spin weight of the spun PAN was 3 gsm, the diameter of the spun nanofiber strand was 1.0 μm, and the thickness of the porous membrane was 10 μm.

The adhesive required for the attachment of the porous membrane was then mixed together with solvent based acrylic adhesives (model name 151A), from Henkel Adhesives Technologies India Private Limited, India, polyvinylidene fluoride (PVdF) and an organic solvent of DMAc, to prepare an adhesive spinning solution. First, PVdF and DMAc were mixed in a ratio of 13 wt %:87 wt %, and then were mixed with 300 parts by weight of an acrylic adhesive based on 100 parts by weight of PVdF, to thereby prepare an acrylic adhesive spinning solution. Subsequently, the acrylic adhesive spinning solution was spun onto the porous membrane to prepare a sample of the porous membrane (Example 1) to which the acrylic adhesive was applied. In this case, the spinning weight of the acrylic adhesive is 2 gsm and the thickness thereof is 1.5 μm.

Comparative Example 1

The sample of the PE separator (Comparative Example 1) was a separator mainly used in a conventional lithium ion battery. In this test, a product having a thickness of 16 μm was used.

Porous Membrane Shrinkage Test

The purpose of this test is to determine if the shrinkage temperature of the porous membrane (Example 1) is higher than the conventional PE separator (Comparative Example 1).

First, samples of a porous membrane (Example 1) and a PE separator (Comparative Example 1) were prepared in the form of rectangular sheets, respectively, in which Example 1 and Comparative Example 1 were coated with an acrylic adhesive.

A porous membrane (Example 1) coated with an acrylic adhesive obtained by the above method and a PE separator (Comparative Example 1) were put together on a hot plate. Then, the shrinkage of the samples of Example 1 and Comparative Example 1 were checked while raising the temperature of the hot plate from 100° C. by 10° C./5 minutes, to increase the temperature of the hot plate, and the photos which were obtained by measuring the behavior of the samples of Example 1 and Comparative Example 1 at 100° C., 150° C., 200° C., 250° C., and 300° C. were shown in FIG. 4.

Figure 4:
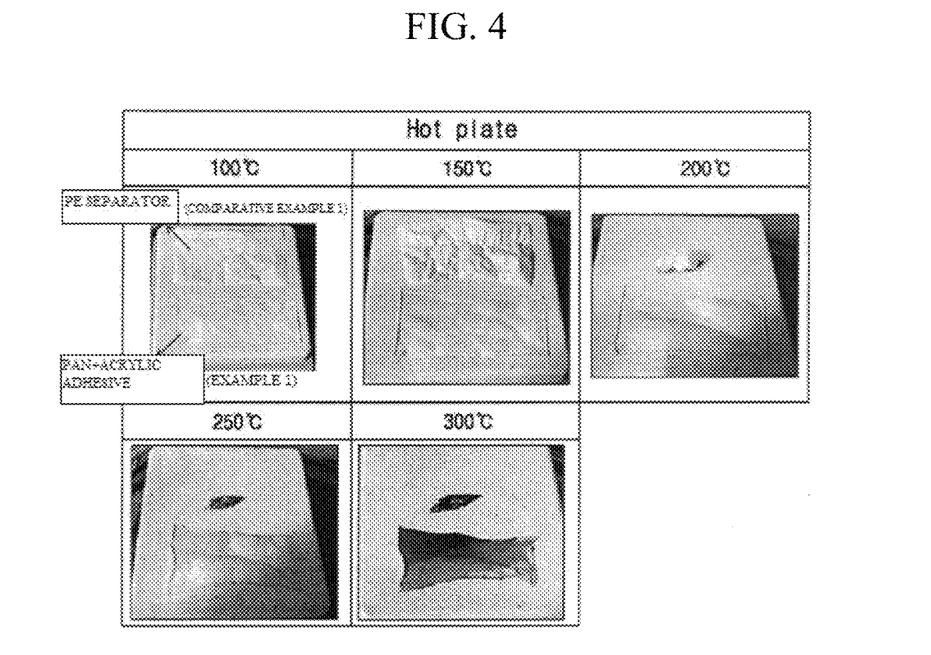
FIG. 4 illustrates comparison photos showing results of the temperature-specific investigation of the high-temperature shrinkage characteristics for a porous membrane and a PE separator used as a short-circuit preventing film in the present invention.

Referring to FIG. 4, in the case of Comparative Example 1 (PE separator), there was no change in the behavior of the sample at 100° C., but it was confirmed that the thermal deformation started at 110° C., the shrinkage progressed at 150° C., and the original shape was shrunk to a small size that could not be recognized, at 200° C., and melted completely at 250° C. In the case of Comparative Example 1 (PE separator), the shape change noticeably is 150° C. Accordingly, in the case of the existing cell assembled using Comparative Example 1 (PE separator), it can be predicted that short circuit proceeds between the anode and the cathode at 150° C.

However, in the case of Example 1 (porous membrane) to which acrylic adhesive was applied, there was no change in the behavior of the sample up to 200° C., but film formation of the acrylic adhesive and shrinkage of the porous membrane proceeded remarkably from 250° C. Therefore, in the cell of the present invention in which the short-circuit preventing films of Example 1 (porous membranes) are laminated on both sides of the electrode, it can be expected that a short circuit between the anode and the cathode will proceed at about 250° C.

In addition, when the short-circuit preventing films are thermally compressed on both sides of the electrode according to the present invention, even if the battery is overheated and the separator cannot reliably separate a cathode and an anode, the short-circuit preventing films can prevent the short circuit between the cathode and the anode, and can aim at stability improvement.

As a result, in the present invention, a separator is manufactured in a state in which the separator is separated from the electrode and then inserted between the cathode and the anode to assure high alignment accuracy when assembled, and to prevent short-circuiting even if the electrode is pushed due to impact applied after being assembled.

Examples 2 to 4, and Comparative Examples 2 to 4

Battery Cell Sample Production

The model name 'Energy Density 4.12 mAh/cm$^2$' of Enertech International Inc., was used as a cathode, and NCM (nickel, cobalt, manganese) series were used as a cathode active material. The total thickness of the cathode was 122±5 μm, and carbon was used as a conductive material, PVdF was used as a binder, and aluminum (Al) was used as a current collector. In addition, the density of a cathode (double side) was 4.12 mAh/cm$^2$ and the loading density of 30±0.5 mg/cm$^2$ was used.

In the case of the anode, graphite was used as an anode active material, and the total thickness of the anode was 125±5 μm, and carbon was used as a conductive material, PVdF was used as a binder, and copper (Cu) was used as a current collector. In addition, the density of an anode (double side) was 5 mAh/cm$^2$ and the loading density of 17.7±0.5 mg/cm$^2$ was used. An acrylic adhesive was applied to the pair of porous membranes prepared in Example 1 as short-circuit preventing films. Then, the pair of porous membranes were thermally compressed on both sides of the anode of the bicell structure by roll press. Accordingly, the anode cell samples of Examples and Comparative Examples were prepared as shown in Table 1.

In the case of the acrylic adhesive, PVdF and DMAc were mixed in a ratio of 13 wt %:87 wt %, and then were mixed with 300 parts by weight (Examples 2 and 3) or 500 parts by weight (Example 4) of an acrylic adhesive based on 100 parts by weight of PVdF, to thereby prepare an acrylic adhesive spinning solution. The acrylic adhesive spinning solution was then changed over the porous membrane in the range of 1.6 gsm to 2.7 gsm, and the roll press temperature was varied and applied to 80° C. (Example 2) and 100° C. (Examples 3 and 4).

The anode sample of Comparative Example 2 was prepared without attaching a porous membrane to the anode surface, the acrylic adhesive of 2.0 gsm was applied in Example 2, the acrylic adhesive of 1.6 gsm was applied in Example 3, the acrylic adhesive of 2.0 gsm was applied in Example 4, the acrylic adhesive of 2.7 gsm was applied in Comparative Example 3, and the acrylic adhesive of 2.6 gsm was applied in Comparative Example 4.

Model 'SB20D' of W-scope company was used as a separator, and the total thickness thereof was about 20 μm and the main material was PE. The air permeability of the separator was 220.1 sec/100 ml and the porosity thereof was 45.5%.

An aluminum pouch employed the model name 'Cell-pack-153PL' of Youl Chon Chemical Co., Ltd., in which the layers were composed of PET (6.8 μm), Nylon (20 μm), Al (40 μm), and CPP (83 μm) from the outside, and the total thickness thereof was 153 μm including 3 μm of an adhesive.

An electrolyte employed the model name 'EC-AM-52' from Enchem company, and was composed of lithium salt of $LIPF_6$ and components of EC, EMC, DEC, PC, VC and PS.

After laminating the cathode, the separator, and the anode of Example 2 to Comparative Example 4 and putting the laminated result into an Al pouch, the electrolyte was injected into the Al pouch, and the inlet of the Al pouch was sealed to prepare a battery cell of AC 650 mAh.

The air permeability, battery capacity, and internal resistance (AC-IR) of the battery cell samples prepared were measured and listed according to the conditions shown in Table 1, and the charge and discharge characteristics of Comparative Example 2 and Example 2 were measured and shown in Tables 2 and 3, respectively.

TABLE 1

| | Acrylic adhesive concentration [part by weight] (relative to 100 parts by weight of PVdF) | Acrylic adhesive weight [gsm] | Roll press temperature [° C.] | Air permeability [cfm] | Capacity [mAh] | AC-IR [mΩ] |
|---|---|---|---|---|---|---|
| Comparative Example 2 | | | | 1.500 | 685.2 (100%) | 25.0 (+0) |
| Example 2 | 300 | 2.0 | 80 | 0.080 | 680.8 (99%) | 34.2 (+9.2) |
| Example 3 | 300 | 1.6 | 100 | 0.375 | 656.7 (96%) | 31.1 (+6.1) |
| Example 4 | 500 | 2.0 | 100 | 0.080 | 655.9 (96%) | 28.7 (+3.7) |
| Comparative Example 3 | 300 | 2.7 | 100 | 0.080 | 650.9 (95%) | 34.8 (+9.8) |
| Comparative Example 4 | 300 | 2.6 | 100 | 0.074 | 650.3 (95%) | 31.9 (+6.9) |

TABLE 2

(Charge characteristics)

| | Discharge capacity @ 0.2 C (mAh) | |
|---|---|---|
| Charge rate | Comparative Example 2 | Example 2 |
| 0.2 C | 100% | 100% |
| 0.5 C | 100% | 100% |
| 1 C | 100% | 100% |
| 2 C | 100% | 100% |

The data of discharge capacity in Table 2 is % for nominal capacity 650 mAh battery cell.

TABLE 3

(Discharge characteristics)

| | | Discharge capacity (mAh) | |
|---|---|---|---|
| Charge rate | Discharge rate | Comparative Example 2 | Example 2 |
| 0.2 C | 0.2 C | 100% | 100% |
| | 0.5 C | 97% | 97% |
| | 1 C | 95% | 94% |
| | 2 C | 91% | 90% |
| | 3 C | 87% | 82% |

In Table 3, the discharge capacity for each C-rate is 0.2 C discharge capacity×100.

Test for Cell High Temperature Ignition Characteristics

Figure 5:
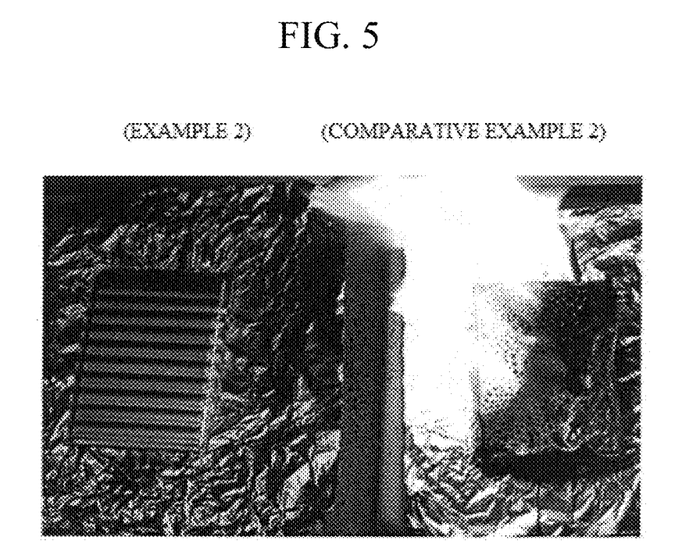
FIG. 5 illustrates photos showing the high temperature ignition characteristics for a cell manufactured with an anode to which the porous membrane of the present invention is applied.

After full charging (4.2V) of the five battery cell samples of each of comparative example 2 and example 2, the full charged battery cell samples are put in a hot box. After raising the temperature from the room temperature to 250° C. at 5° C./min and increasing the temperature of the hot box to maintain for 10 minutes, the ignition patterns of the battery cell samples are observed and the voltage of the cell is measured. The results are shown in Table 4 below, and photos are shown in FIG. 5. In this case, the temperature of the cell is measured by attaching a temperature sensor to the cell surface. The voltage changes of the cell are observed by clamping the clip wire to the terminal of the cell.

TABLE 4

| Model | | Comparative Example 2 | Example 2 |
|---|---|---|---|
| Cell surface ignition temperature | Sample 1 | 204° C. | No ignition occurrence |
| | Sample 2 | 203° C. | No ignition occurrence |
| | Sample 3 | 188° C. | No ignition occurrence |
| | Sample 4 | 193° C. | No ignition occurrence |
| | Sample 5 | 194° C. | No ignition occurrence |

When considering that the surface temperature of the cell increased at the rate of 5° C./min, as a result of analyzing the graph at 200° C. or higher where the ignition is expected from the temperature measurement result, it was judged that no ignition occurred in the cell of Example 2 (a radical temperature rise occurs due to sparks during ignition). In the battery cell of Example 2, no ignition occurred up to about 250° C. as shown in FIG. 5. As a result, in the battery cell of Example 2, the vent starts at 140-160° C., and thermal deformation of the 'porous membrane+acrylic adhesive' occurs around 250° C. and thus there may be a possibility of a short circuit. However, it was presumed that most of the electrolyte was vented so that no ignition occurred.

However, in Comparative Example 2, ignition occurred at a high temperature (about 200° C. or so). As a result, in the battery cell of Comparative Example 2, the thermal deformation of the PE separator starts at 110° C., and the vent starts at 140 to 160° C., but it is presumed that ignition occurred in an electrolyte that was not vented at around 200° C. due to a short-circuit phenomenon.

Peeling Test of Short-Circuit Preventing Film

Figure 6A:
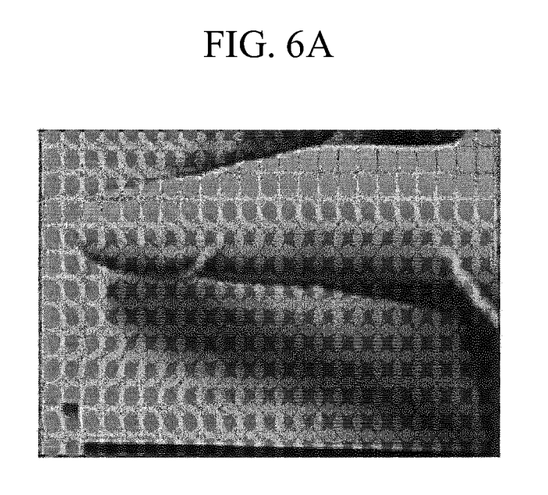
FIG. 6A illustrates a photo showing a physical peeling test process of the short-circuit preventing film according to the present invention.

The anode sample prepared in Example 2 was used to determine whether short-circuit preventing film was physically peeled off. In the physical peeling test, as shown in FIG. 6A, the short-circuit preventing film was scraped ten times with the finger to see if peeling occurred.

As a result of the peeling test, it was found that no peeling occurred in the short-circuit preventing film when the short-circuit preventing film was scraped off from the finger, and thus the peeling of the short-circuit preventing film from the anode did not occur during transportation or general operation.

Peeling Test of Short-Circuit Preventing Film in Electrolyte

Figure 6B:
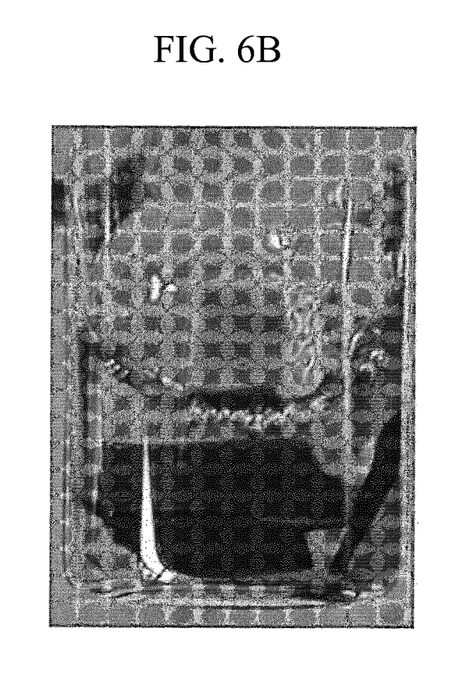
FIG. 6B illustrates a photo showing the peeling test of the short-circuit preventing film in the electrolyte of the short-circuit preventing film according to the present invention.

As shown in FIG. 6B, the anode sample prepared in Example 2 was placed in a reagent bottle containing an electrolyte solution to determine whether peeling occurred. The anode sample was cut into about 1 cm×1 cm and then put in the reagent bottle contained in the electrolyte solution, shaken 30 times, and placed and kept in a 60° C. hot chamber for 7 days. After 7 days of storage, the anode sample was taken out and shaken about 30 times to check for peeling. As a result, it was confirmed that the peeling of the anode sample did not occur.

As described above, the present invention provides an electrode with price competitiveness even in a mass production process by laminating a porous membrane as a short-circuit preventing film on the surface of the electrode by a thermocompression method using a roll press.

In the present invention, by forming the short-circuit preventing film 140 on the surface of the electrode, it is possible to prevent micro short-circuit due to desorption of the fine active material.

In addition, since the short-circuit preventing film 140 according to the present invention has a porous web structure having a small heat shrinkage, heat resistance, and high porosity due to being made of a heat-resistant polymer, the short circuit between the cathode 110 and the anode 120 is prevented and the ion conductivity is not affected.

In addition, the short-circuit preventing film of the present invention is integrally formed on the surface of the electrode to prevent the space between the anode and the film type separator from being formed, thereby preventing lithium ions from accumulating and being precipitated in the lithium metal. As a result, the formation of dendrite on the surface of the anode can be suppressed, to thus improve the stability.

In the above-described embodiment, the electrode assembly in which the secondary battery forms a bicell structure has been described as an example. However, the present invention can also be applied to an electrode assembly having a full cell structure.

In addition, although the lithium ion battery using the electrolyte has been described in the above embodiments, the present invention can also be applied to a polymer battery using a gel type polymer electrolyte.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention can be applied to an electrode in which a short-circuit preventing film made of a porous polymer web of heat-resistant polymer fibers is formed with a high bonding force on the surface of the electrode so that, even if the battery is overheated, the short-circuit preventing film prevents a short circuit between the cathode and the anode, thereby improving stability, and a secondary battery using the electrode.

What is claimed is:

1. A secondary battery comprising:
    a cathode;
    an anode; and
    a separator disposed between the cathode and the anode,
    wherein at least one of the cathode and the anode comprises;
    an electrode current collector;
    an active material layer formed on the electrode current collector; and
    a short-circuit preventing film formed on the active material layer, and
    wherein the short-circuit preventing film comprises: a porous membrane formed of integrated nanofiber strands, and the nanofiber stands are formed of polyacrylonitrile (PAN).

2. The secondary battery of claim 1, wherein the porous membrane is bonded to the active material layer using an acrylic adhesive.

3. The secondary battery of claim 2, wherein the bonding between the active material layer and the porous membrane is a thermocompression bonding.

4. The secondary battery of claim 2, wherein a weight of the acrylic adhesive has a weight ranging 1.6 grams per square meter (gsm) to 2 gsm.

5. The secondary battery of claim 1, wherein the porous membrane has a thickness ranging 10 μm to 12 μm and a porosity ranging 40% to 80%.

6. The secondary battery of claim 1, wherein the porous membrane has an air permeability of at least 0.080 cubic feet per minute (cfm).

7. The secondary battery of claim 1, wherein the nanofiber strands have a diameter ranging from 100 nm to 1.5 μm.

* * * * *